UNITED STATES PATENT OFFICE.

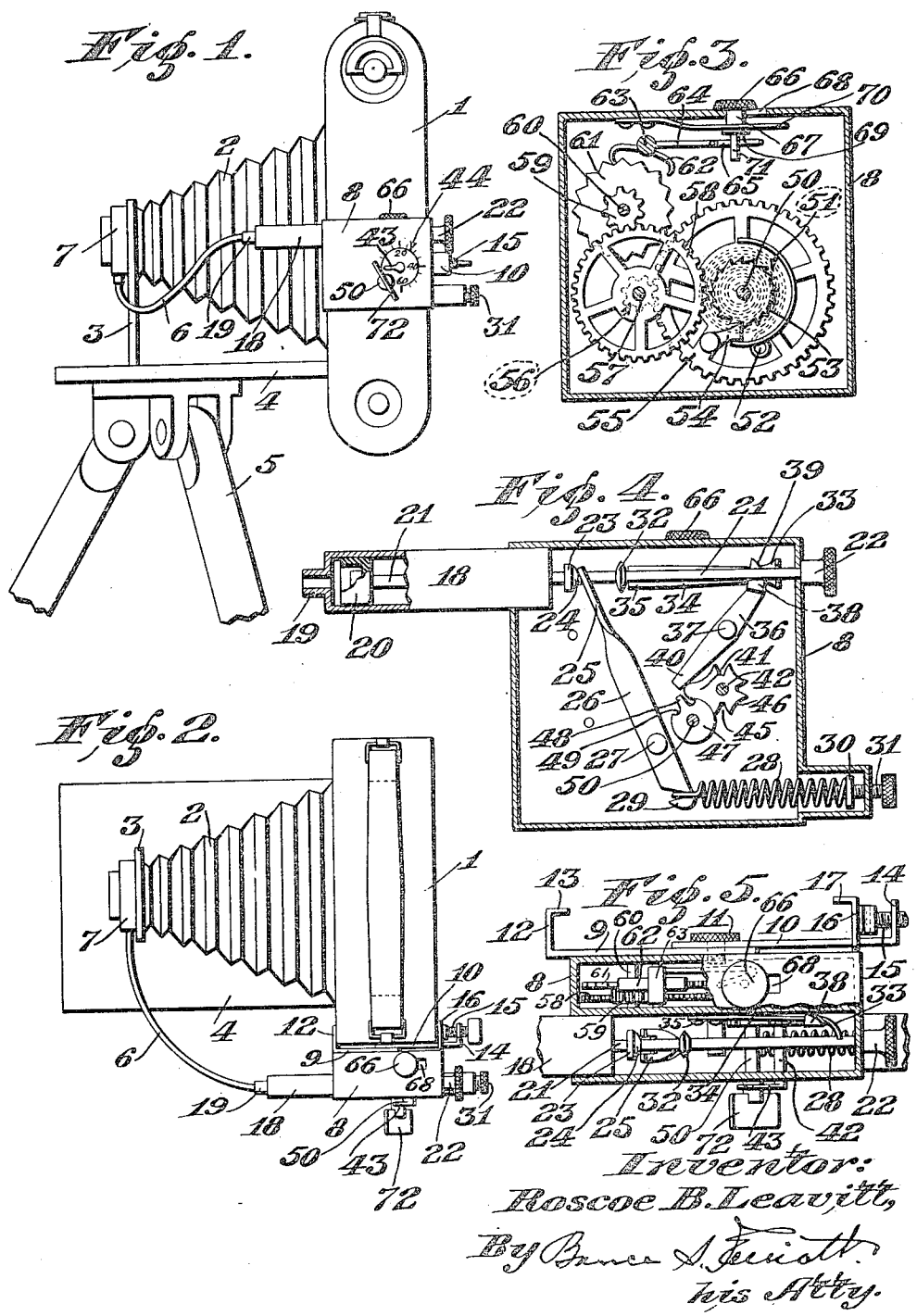

ROSCOE B. LEAVITT, OF HOUSTON, MISSOURI.

SHUTTER-OPERATOR FOR CAMERAS.

1,223,807.  Specification of Letters Patent.  Patented Apr. 24, 1917.

Application filed June 25, 1915. Serial No. 36,401.

*To all whom it may concern:*

Be it known that I, ROSCOE B. LEAVITT, a citizen of the United States, residing in Houston, in the county of Texas and State of Missouri, have invented new and useful Improvements in Shutter-Operators for Cameras, of which the following is a specification.

This invention relates to shutter operators for photographic cameras. It has for its objects to produce a simple and efficient device which may be readily applied to any ordinary camera having the usual bulb-actuated shutter mechanism, whereby, in substitution for the bulb, the shutter is operated automatically at a predetermined instant to provide for the time regulation of the actuating mechanism so that the shutter may be operated at different predetermined instants whereby one person may set the camera and yet have sufficient time to pose for the taking of his own picture either alone or in a group; and to attain certain advantages as will hereinafter more fully appear.

The invention consists in the parts and in the arrangements and combinations of parts hereinafter described and claimed.

In the drawing,

Figure 1 is a side view of an ordinary folding camera, set upon a tripod and equipped with a shutter-operating device to illustrate an embodiment of the invention;

Fig. 2 is a top plan view;

Fig. 3 is a section through the casing of the device, on an enlarged scale, showing the clock-work motor and brake therefor;

Fig. 4 is a section through another portion of the casing showing the time-controlling and actuating mechanism for the shutter operator; and Fig. 5 is a view partly in top plan and partly in horizontal section.

Referring now to the drawing, the numeral 1 indicates the casing of an ordinary camera of the folding type, the bellows 2 being extended and supported at its outer end on a frame or carriage 3 which is slidably mounted on a folding bed-plate 4; the latter being shown as secured on a tripod 5, and adapted, when detached therefrom, to be folded up so as to inclose the bellows and the parts associated therewith when in retracted position within the casing 1.

As usually constructed and arranged a camera of this kind is provided with a bulb-operated shutter mechanism, the bulb being applied to the outer end of a rubber tube whose inner end is attached to the housing of the shutter mechanism in an obvious and well-known manner. In the drawing this tube is indicated by the numeral 6 and the housing by the numeral 7. Provision is usually made for operating the shutter instantaneously, or, in other words, for the opening and closing of the shutter very quickly, and also with somewhat retarded movement, by a single compression of the bulb; a regulating device being provided for varying the speed at which the shutter operates. Provision is further made for setting the mechanism so that the shutter is opened upon the compression of the bulb and remains open until the compression is relieved. This is commonly called "bulb" and "short time" exposure. For regular time exposure provision is made for setting the mechanism so that the shutter is opened upon a compression of the bulb, it remaining open until the bulb is given a second compression. The device of the present invention is not concerned with this last-mentioned operation, but has only to do with the two first-mentioned, namely, instantaneous or retarded exposure and "bulb" or "short time" exposure, which latter is in effect a time exposure, although distinguished from that which is characterized as "time exposure" as above described. The shutter mechanism in itself forms no part of the present invention other than in combination with the operating mechanism now to be described, and therefore no description of its construction is here given in detail.

The shutter operator of the present invention, which is to be used in place of the bulb, comprises a casing 8 which is provided with suitable clamping means whereby it may be readily attached to the camera casing 1, or to the folding bed-plate or door 4. As shown in the drawing, the clamp comprises two oppositely disposed plates 9 and 10, whose inner end portions are overlapped and slotted to receive a screw 11 by which they may be secured, in adjusted relation, to the casing 8. The outer end portion of the plate 9 is turned substantially at right angles, as at 12, and then rebent, as at 13; while the outer end portion 14 of the plate 10 is bent at right angles and provided with a screw-threaded opening to receive a screw 15 whose inner end portion has a swivel connection with a clamping plate 16, the end portion 17 of which is bent to correspond to the end portion 13 of the plate 9; said clamping plate 16 being opposed to the portion 12 of the plate 9 so that, by manipulating the screw 15, said portions 12 and 16 are made to engage the camera casing 1 or the folding bed-plate 4, as may be desired.

Secured to the casing 8 is a cylinder 18, at the outer end of which is a nipple 19 for the attachment of the tube 6, in lieu of the usual bulb hereinbefore described. Within the cylinder 18 is a piston 20 which is attached to a rod 21 extending through the casing and provided on its end with a knob 22. On the rod 21 is an annular shoulder or collar 23, having a rounded or tapered face 24 against which the bifurcated end portion 25 of a lever 26 engages. The lever 26 is pivoted on the casing 8, as at 27, and has a spring 28 attached to its end portion 29, said spring acting to throw the piston 20 forward or to the outer end of the cylinder 18. The spring 28 is attached at one end to a collar or nut 30 which is mounted on a screw 31, by the adjustment of which the tension of the spring is regulated.

On the rod 21 is a second annular shoulder or collar 32 which is beveled or tapered on opposite sides and adapted to engage behind the curved end portion 33 of a spring tongue 34, which latter is secured to the casing, as at 35. Coöperating with the spring tongue 34 is a lever member 36 which is pivoted to the casing 8, as at 37. One end portion of this lever member 36 is off-set, as at 38, and disposed so as to overhang the spring tongue 34 in coöperative relation to the curved end portion 33 thereof, the edge of said portion 38 of the lever which engages the end of the spring tongue, in a manner to be later described, being curved, as at 39. The opposite end portion 40 of the lever member 36 is disposed in coöperative relation to a rotating tappet or tripper 41, which latter, in its movement, is adapted to engage said lever 36 so as to move it in a direction to cause the curved edge 39 of the extension 38 to engage the curved portion 33 of the spring tongue 34 so as to effect the disengagement of the spring tongue from the shoulder 32 on the piston rod 21, and whereupon the spring 28, through the medium of the lever 26, and the engagement of the latter with the rod 21, throws the plunger 20 forward with considerable force.

The tappet 41 is fixedly secured on a shaft or spindle 42 which is journaled on the casing 8 and has on its outer end a pointer 43 which coöperates with a dial 44 on the outside of the casing, said dial being suitably graduated and marked for the purpose of setting the device to operate the shutter at different predetermined instants, as will presently more fully appear.

The tappet is provided with a series of recesses 45 between which the peripheral portion of the tappet is concaved, as at 46, the curvature of the concavity corresponding to the circumference of a gear disk 47 which coöperates therewith, said disk having a single tooth 48 on opposite sides of which are recesses 49. By this arrangement, as more clearly shown in Fig. 4, the tappet is normally locked and it can only be moved by the gear disk 47 when the tooth 48 of the latter is brought into engagement with a recessed portion 45 of the tappet during the rotation of the disk in either direction.

The gear disk 47 is fixedly secured on a shaft 50 which has secured thereto the inner end of a spiral spring 51 whose outer end is secured to the casing 8, as at 52. On this shaft 50 is also secured a ratchet wheel 53 which is engaged by a spring-pressed pawl 54 on a gear wheel 55, so that, when the shaft is turned in one direction the spring is wound, the ratchet wheel slipping by the pawl and the gear wheel remaining stationary; but when the shaft is rotated in the opposite direction, the engagement of the ratchet wheel and pawl is such that the gear wheel rotates therewith.

The gear wheel 55 meshes with a pinion 56 on the shaft 57 which has thereon a gear 58. The gear 58 is in mesh with a pinion 59 on a shaft 60 which carries a scape-wheel 61 with which coöperates an anchor escapement or pallet 62 from the rock-shaft 63 of which extends a wire 64 whose outer end portion 65 is rebent.

A brake-button 66 on the outside of the casing 8 has a shank portion 67 which projects into the casing through a slot 68 in the top wall thereof, said shank portion having an annular flange 69 against which a spring tongue 70 bears so as to yieldably hold the brake button at either end of the slot 68 to which it may be moved. On the inner end of the brake button is a pin or extension 71 arranged and adapted to engage the rebent end portion 65 of the pallet extension or wire 64 when the brake-button is at the end of the slot as shown in Fig. 3, so as to prevent the actuation of the escapement which in turn prevents the operation of the clockwork mechanism until such time as brake-button is moved to the opposite end of the slot.

The use of the device in making instantaneous (either quick or retarded action)

exposures will be first described. The camera being properly focused, the shutter mechanism is set just the same as were the bulb to be used. The brake-button 66 is moved to the forward end of the slot 68 to prevent the actuation of the clock-work mechanism. The shaft 50 is rotated to wind the spring 51 through the medium of a handle 72 or other suitable device or key which may be applied to the outer end of the shaft. The shaft may be rotated until the tooth 48 of the gear disk 47 has engaged one or more of the recesses 45 of the tappet 41, depending upon how long it is desired the motor shall run before the piston 20 is actuated to operate the shutter. For example, if the tooth is caused to engage only the first recess 45 the winding of the spring and setting of the tappet will be stopped when the pointer 43 has moved through an angle of ninety degrees or one-fourth of a circle. Obviously, therefore, the tappet will be moved back to normal position and actuates the lever member 36 in a shorter time than if the tappet had been moved farther by the engagement of the tooth with the other recesses 45, in which case the shaft 50 will have been given two or more complete revolutions and the spring correspondingly wound. As shown, the device is capable of being set to operate at three different intervals or periods of time, namely, at twenty, forty or sixty seconds. But it is obvious that it can be constructed and arranged to run for any desirable length of time without departing from the spirit of the invention.

After the motive and timing mechanisms have been set as above described, the piston 20 is pulled back, by grasping the knob 22, until the shoulder 32 on the rod 21 engages the end 33 of the spring tongue 34. The brake-button 66 is then moved to the rear end of the slot 68, thereby releasing the escapement which controls the speed of the clock-work motor. As soon as the tappet 41 engages the lever member 36 the spring tongue 34 is released from the shoulder 32 and the spring 28 drives the piston forward. This actuation of the piston causes a compression of the air in the tube 6 which effects the operation of opening and closing the shutter.

For "bulb" or "short time" exposure the mechanism of the operator is set the same as above described, the only difference being that the shutter mechanism is set accordingly and the shutter remains open, after the piston 20 has been driven forward, until such time as the air pressure in the tube has been reduced sufficiently by leakage to permit the shutter to close, which is in effect the equivalent of squeezing a bulb and letting go of the same were a bulb used in the ordinary way. The length of time the shutter will remain open depends upon the amount of leakage which is afforded between the piston and wall of the cylinder.

I claim:

1. In a device of the class described, a spring-pressed shutter operating member, a releasable catch for holding said member retracted, releasing mechanism for said catch comprising a lever member having a cam portion arranged and adapted to engage said catch, a rotatory member having a portion arranged and adapted to engage said lever member at a point during its rotation, a gear member in coöperative relation to said rotatory member, said gear member and said rotatory member being relatively constructed and arranged so that normally the former prevents rotation of the latter, said gear member and said rotatory member being also constructed and arranged for engagement once during each complete rotation of the gear member whereby said rotatory member is rotated partially during each rotation of said gear member, a clock-work mechanism for actuating said gear member, means for energizing said clock-work mechanism and simultaneously rotating said gear member to set said rotatory member so as to actuate said lever member at different predetermined instants, and a releasable brake for said clock-work mechanism.

2. A pneumatic shutter operator for cameras comprising a casing, a cylinder on said casing having provision for a tube connection with the shutter mechanism of the camera, a piston in said cylinder, a rod connected to said piston, a lever in coöperative engagement with said rod, a spring connected to said lever and acting to move the piston in one direction, a stop on said rod, a spring catch on said casing arranged and adapted for the engagement of said stop, a knob on said rod for withdrawing said piston against the action of its spring and for effecting the engagement of said stop with said spring catch, a releasing device for said spring catch comprising a lever member, a rotating tappet arranged in coöperative relation to said lever member so as to engage the same at a point during its rotation, a clock-work mechanism for actuating said tappet, a releasable brake for said clock-work mechanism, and means for energizing said clock-work mechanism and setting said tappet to actuate said lever member at different predetermined instants.

3. In a pneumatic shutter operator for cameras, a cylinder having a spring-actuated piston therein, means for releasably holding said piston against the action of its spring, and means for releasing said holding means, comprising a lever member, a rotating tappet arranged in coöperative relation to said lever member, a gear disk arranged in coöperative relation to said tappet so as to normally prevent rotation of the latter, said gear disk and said tappet being relatively arranged for engagement once during each complete revolution of the gear disk whereby said tappet is rotated partially during each rotation of the gear disk, a shaft on which said gear disk is mounted, a clock-spring connected to said shaft so as to be wound proportionately thereby when the shaft is rotated to set said tappet, a clock-train having a ratchet and pawl connection with said shaft, a speed controlling escapement for said clock-train, and a releasable brake coöperating with said escapement.

ROSCOE B. LEAVITT.